(12) United States Patent  
Giessler et al.

(10) Patent No.: US 9,236,948 B2  
(45) Date of Patent: Jan. 12, 2016

(54) POWER MANAGEMENT IMPLEMENTATION IN AN OPTICAL LINK

(71) Applicant: Intel Corporation, Santa Clara, CA (US)

(72) Inventors: Klaus D. Giessler, Menlo Park, CA (US); Christine M. Krause, Boulder Creek, CA (US)

(73) Assignee: INTEL CORPORATION, Santa Clara, CA (US)

( * ) Notice: Subject to any disclaimer, the term of this patent is extended or adjusted under 35 U.S.C. 154(b) by 125 days.

(21) Appl. No.: 14/182,492

(22) Filed: Feb. 18, 2014

(65) Prior Publication Data

US 2014/0161467 A1  Jun. 12, 2014

Related U.S. Application Data

(62) Division of application No. 12/974,654, filed on Dec. 21, 2010, now Pat. No. 8,712,236.

(51) Int. Cl.  
*H04B 10/50* (2013.01)  
*H04B 10/524* (2013.01)  
*H04B 10/508* (2013.01)  
*H04B 10/40* (2013.01)  
*H04Q 11/00* (2006.01)

(52) U.S. Cl.  
CPC .............. *H04B 10/524* (2013.01); *H04B 10/40* (2013.01); *H04B 10/508* (2013.01); *H04B 2210/08* (2013.01); *H04Q 11/0062* (2013.01); *H04Q 2011/0079* (2013.01)

(58) Field of Classification Search  
CPC ........................... H04B 10/508; H04B 10/524  
See application file for complete search history.

(56) References Cited

U.S. PATENT DOCUMENTS

2005/0105900 A1  5/2005  Akimoto et al.

*Primary Examiner* — Jerry Rahll  
(74) *Attorney, Agent, or Firm* — Schwabe Williamson & Wyatt PC

(57) ABSTRACT

An optical link power management scheme takes the best advantage of a dynamic connection environment, where ports may be connected and disconnected at any time, and where data flows may start and stop as needed by the applications using the high speed data links Power consumption is optimized, eye safety standards are met, and robust connection detection is preserved.

20 Claims, 2 Drawing Sheets

POWER MANAGEMENT IMPLEMENTATION IN AN OPTICAL LINK

CROSS REFERENCE TO RELATED APPLICATION

The present application is a divisional of and claims priority under 35 U.S.C. §120 to U.S. patent application Ser. No. 12/974,654, entitled "POWER MANAGEMENT IMPLEMENTATION IN AN OPTICAL LINK," filed Dec. 21, 2010, and incorporated herein by reference in its entirety.

FIELD OF THE INVENTION

Embodiments of the present invention are directed to optical links and, more particularly, to optical links which may save power when the optical link is unplugged and maintain eye safety standards.

BACKGROUND INFORMATION

Most optical links to date are used in the telecom and datacom industries, where optical modules tend to be connected during installation, and stay connected for the life of the equipment. These connections stay active as long as the link is connected, never switching off once started.

Optical links to be used in a consumer application may have different requirements, as the links are used dynamically, with devices being plugged and unplugged from the systems. In this case, it is desirable to save power when a port is not being used, insure that the port meets eye safety standards when the fiber is not connected, and that the port is able to robustly and reliably detect connections as they occur.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Meeting the simultaneous requirements of low power during idle times, eye safety, and robust connection detection requires the implementation of a power management scheme for the optical link.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
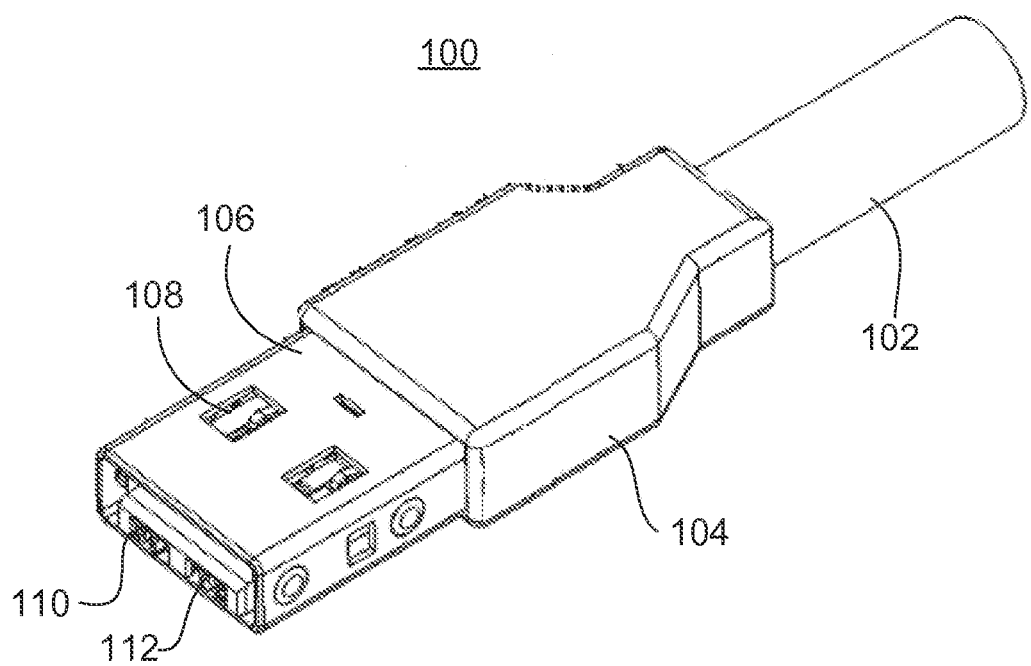
FIG. 1 is a plan view of a universal serial bus (USB) device with optical capabilities, such as a light-peak (LPK) device.

Referring now to FIG. 1 there is shown an example of a universal serial bus (USB) device with additional optical capabilities for achieving even greater bandwidths. The USB device 100 has been referred to as the so-called Light Peak (LPK) optical USB. As shown, a cable 102 may join with a plastic housing 104. A plug head 106 may include openings 108 in the head 106 used to lock the connector in place when plugged into a corresponding female connector. Optical ports 110 and 112 may be housed in the head 106 to provide optical capabilities. Optical port 110 may for example be to connect to an optical transmitter (Tx) module and optical port 112 may connect to an optical receiver (Rx) module.

Figure 2:
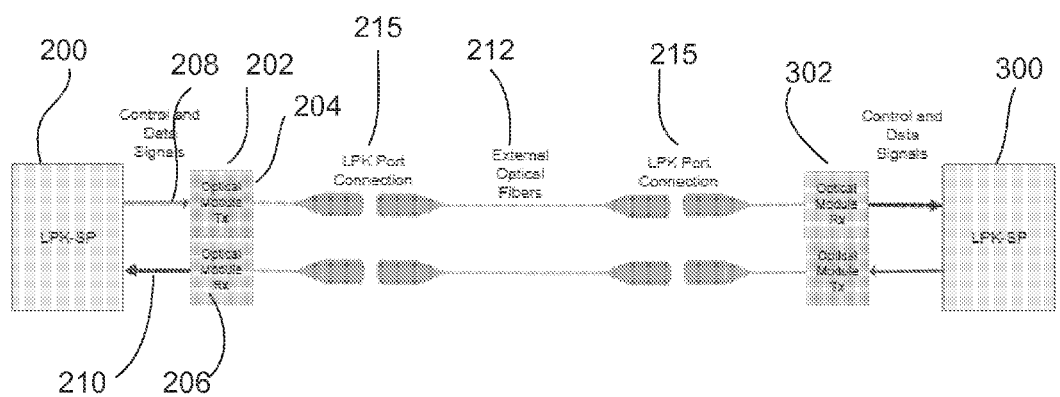
FIG. 2 a dual simplex optical link according to one embodiment of the present invention.

Referring to FIG. 2, there is shown a dual simplex optical link according to one embodiment of the present invention. In the Light Peak implementation, the components involved comprise a Light Peak Switch Port (LPK-SP) 200 and a Light Peak Optical Module (LPK-OM) 202. The LPK-OM 202 may comprise an optical transmit (Tx) module 204 and an optical receiver (Rx) module 206. Control and data signals 208 and 210 between the LPK-SP 200 and the LPK-OM 202 select the various power states of the module 202 and directly control the on/off conditions of the laser transmitter 204.

The optical receiver 206 may also be placed in the various power states, and then uses the received optical signals to indicate link states to the receiving portion of the LPK-SP 200. A complete optical link may comprise a LPK-SP 200 and LPK-OM 202 on one side, an optical fiber connection 212, and another LPK-OM 302 and LPK-SP 300 on the other side. Each link is dual-simplex, with each side having a transmit channel connected to the opposite side receive channel. A separate fiber may be used for each direction, with both fibers 212 contained in the same optical cable.

Future implementations may combine the LPK-SP 200 and LPK-OM 202 into a more integrated unit, where the control and data Signals 208 become internal to the design. However, the power management functionality and states being used to control the optics would still exist.

Another option may be the integration of the LPK-OM 202 into a mechanical connector eliminating the fiber jumper from the LPK-OM 202 to the LPK Port Connection 215, and building the system side of the port connection directly into the mechanical connector. This scheme also would not alter the power management functionality between the LPK-SP 200 and the LPK-OM 202; it only changes the physical connection of the LPK-OM optical interface.

When an optical port has no connection, it is desirable to save as much power as possible, and it is desired to meet eye safety standards. This is achieved by placing the optical module into a very low power Standby state, where the transmit laser 204 is disabled most of the time. The transmit stage 204 consumes almost no power while the laser is disabled. At the same time, the receive stage 206 has minimal functionality, where it only needs to detect the presence of low speed optical pulses (LSOP) and signal these pulses to the LPK-SP 200.

In order to actually detect a connection, the transmit stage 204 is pulsed on periodically, with a very low duty cycle, low speed pulse. The pulse represents below a 0.25% duty in one embodiment. This saves a significant amount of power for transmit stage 204 and easily meets the eye safety standards for an open port. When a physical connection is made, by connecting optical fiber between the two sides of the link, the link partner receiver 302 would detect the low speed optical pulse (LSOP), and signal the reception to the LPK-SP 300. At this point, the LPK-SP 200 can begin the detection process.

For robust connection detection, including the avoidance of false connection detection, the LPK-SP 200 may use a number of LSOPs to be received before deciding that a connection exists. For example, three pulses in a row, with no missing pulses, may be used to indicate that a fiber is connected. Once the pulses have been detected, the LPK-SP 200 commands the LPK-OM 202 to transition to a higher power Idle state, where more functionality is enabled and where higher speed responses are possible. The connection uses a modified LSOP, with a somewhat higher duty cycle of about 1% to signal to the link partner that the Idle state has been activated. The LPK-SP 200 and LPK-OM 202 continue this signaling until both sides of the link are in the same state. That is, the LPK-SP 200 is both sending and receiving the modified LSOP.

Once both sides of the link are signaling the modified LSOP, the link is transitioned to the Active state, using a different LSOP signal called RESUME. While in the Active state, the optical link is fully functional, sending high speed data from each transmit stage to the link partner receive stage. This involves higher power consumption, as all high speed data circuits are operational, and the optical signal is being modulated with the high speed data. Since the optical fibers are now connected in the link, the eye safety standards allow a higher power optical signal to be transmitted, as the signal will not be exposed to an open port while the fiber is connected.

Figure 3:
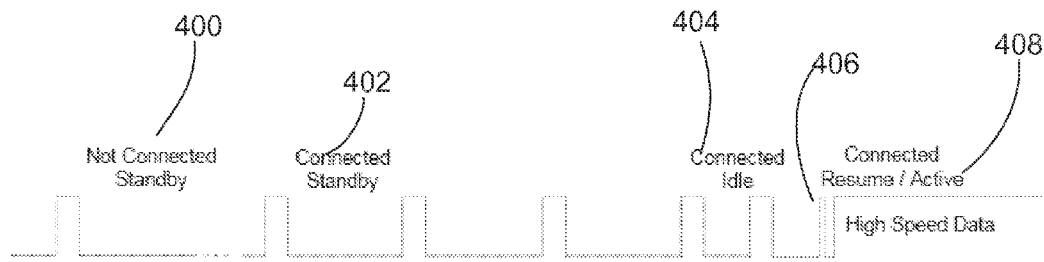
FIG. 3 timing diagram illustrating low speed optical pulses (LSOPs) for power management of an optical link according to one embodiment.

The above described connection signaling scheme is illustrated in FIG. 3. When the optical link is not connected 400 the optical link is in a standby state and disabled most of the time as shown pulsing at a duty cycle below 0.25% using very little power and easily meeting eye safety standards. Once connected the link goes into a connected standby state 402 and the transmitter pulses a number of pulses, for example three low speed optical pulses, in a row signaling the receiver on the other side that a connection has been made. The optical link then transitions to a higher power Connected Idle state 404, for example a 1% duty cycle pulses, where more functionality is enabled and where higher speed responses are possible. This enables detection of a shorter duration RESUME pulse 406 to transition to an Active state 408 wherein the optical link is fully functional, sending high speed data from each transmit stage to the link partner receive stage.

Once in the Active state 408, the link can transition back and forth between Active and Idle without the fiber being disconnected. This represents another opportunity to save power in cases where there is a pause in the data flow. Since the fibers stay connected, it is possible to quickly transition back and forth between the Active and Idle states, as needed. During extended Idle states, the transmit stages send another LSOP signal, call CONNECT, to indicate that the fibers are still connected and that the link is still enabled. Note that the transition between Active and Idle can be independent in each fiber direction, so one link partner could be sending high speed data to the corresponding receive stage, while that transmit stage is signaling only the CONNECT pulses in the opposite direction.

If the fibers are disconnected from an enabled link, either on purpose, or due to a fault, the receive stage will no longer be receiving any optical signal, and the LPK-OM 202 will signal this case to the LPK-SP 200. If the receive stage was in the Idle state, receiving only the CONNECT LSOP signals, these signals will also no longer be detected. This would be the indication that the link has been disconnected. At this point, the LPK-SP 200 will disable the transmit stage, to again comply with the eye safety standards, then the LPK-OM 204 back to the Standby state, where it will wait for another connection.

The LPK-OM 204 should maintain the eye safety limits even when faults occur that would cause the optical signals to exceed these limits. Circuitry exists to shut down the laser in any fault situation; open, hardware short, or software issue, that would cause a violation to the eye safety limits.

This power management scheme takes the best advantage of a dynamic connection environment, where ports may be connected and disconnected at any time, and where data flows may start and stop as needed by the applications using the high speed data links. Power consumption is optimized, eye safety standards are met, and robust connection detection is preserved.

As a side benefit, running the transmit lasers in a higher power mode after the fibers are connected allows a larger range of laser transmit power to be used than has been the case in traditional telecom or datacom connections. This enables higher production yields for the lasers, larger link margins with similar eye safety classifications, and lower costs for the optical modules. This benefit would not be possible without the power management scheme to keep laser power very low while the fibers are disconnected.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus to communicate over an optical link, the apparatus comprising:
    an optical module to:
        transmit a first set of optical pulses at a first duty cycle via the optical link; and
        receive a determined number of optical pulses of a second set of optical pulses at the first duty cycle via the optical link; and
    a control module coupled with the optical module, the control module to:
        determine that a communicative connection over the optical link is established based on the receipt of the determined number of optical pulses of the second set; and
        cause the optical module to transmit a third set of optical pulses at a second duty cycle via the optical link, wherein the second duty cycle is greater than the first duty cycle.

2. The apparatus of claim 1, wherein the first, second, and third sets of optical pulses comprise low speed optical pulses (LSOPs).

3. The apparatus of claim 1, wherein the communicative connection comprises a connection between the apparatus and another optical link apparatus.

4. The apparatus of claim 1, wherein the optical module is to receive one or more optical pulses of a fourth set of optical pulses at the second duty cycle via the optical link, and wherein the control module is further to, in response to the receipt of the one or more optical pulses of the fourth set, cause the optical module to transmit a resume optical pulse having a first duration that is less than a second duration of the one or more optical pulses of the fourth set, the resume optical pulse to indicate an ability to communicate high speed data to another optical link apparatus.

5. The apparatus of claim 4, wherein the control module causes the apparatus to transition to a first power state that comprises a not-connected standby state, to enable the transmission of the first set of optical pulses.

6. The apparatus of claim 5, wherein the control module causes the apparatus to transition to a second power state that comprises a connected standby state, after the receipt of the determined number of optical pulses of the second set.

7. The apparatus of claim 6, wherein the control module causes the apparatus to transition to a third power state that comprises a connected idle state that is higher than the first or second power states of the apparatus, to enable the transmission of the third set of optical pulses.

8. The apparatus of claim 7, wherein the control module causes the apparatus, after the transmission of the resume optical pulse, to transition to an active state, in which the apparatus is to transmit high speed data over the optical link, the active state comprising a fully powered state of the apparatus that is higher than the third power state.

9. The apparatus of claim 1, wherein the optical module includes an optical transmit module configured to transmit the optical pulses, and an optical receive module configured to receive the optical pulses.

10. The apparatus of claim 9, wherein the optical transmit module includes a transmit laser configured to transmit the optical pulses, wherein the control module is to control the transmission by the transmit laser.

11. The apparatus of claim 10, wherein the optical link comprises a dual simplex optical link including the control module, the optical module, and a port connection coupled with the optical module, to communicatively connect the apparatus with another optical link apparatus.

12. A method, comprising:
    transmitting, by an optical link apparatus, a first set of optical pulses at a first duty cycle via an optical link;
    receiving, by the optical link apparatus, a determined number of optical pulses of a second set of optical pulses at the first duty cycle via the optical link;
    determining, by the optical link apparatus, that a communicative connection over the optical link is established, based on the receipt of the determined number of optical pulses of the second set; and
    transmitting, by the optical link apparatus, a third set of the optical pulses at a second duty cycle via the optical link, wherein the second duty cycle is greater than the first duty cycle.

13. The method of claim 12, further comprising:
    receiving, by the optical link apparatus, one or more optical pulses of a fourth set of optical pulses at the second duty cycle via the optical link; and
    transmitting, by the optical link apparatus, a resume optical pulse having a first duration that is less than a second duration of the optical pulses of the first, second, third, and fourth sets.

14. The method of claim 13, further comprising: transitioning, by the optical link apparatus, to a first power state of the apparatus comprising a not connected standby state, to enable the transmitting of the first set.

15. The method of claim 14, further comprising: transitioning, by the optical link apparatus, to a second power state of the apparatus comprising a connected standby state, after the receiving a determined number of the second set.

16. The method of claim 15, further comprising: transitioning, by the optical link apparatus, to a third power state of the apparatus comprising a connected idle state, to enable the transmitting of the third set, the third power state being higher than the first or second power states of the apparatus.

17. The method of claim 16, further comprising: after the transmitting a resume optical pulse, transitioning, by the optical link apparatus, to an active state, in which the apparatus is to transmit high speed data over the optical link, the active state comprising a fully powered state that is higher than the third power state.

18. The method of claim 17, wherein the receiving a determined number of optical pulses of the second set includes receiving, by the optical link apparatus, the determined number of optical pulses from another optical link apparatus.

19. The method of claim 18, wherein the transmitting the first and the third sets via the optical link includes transmitting, by the optical link apparatus, the first and the third sets to the another optical link apparatus.

20. The method of claim 19, wherein the transmitting a resume optical pulse includes transmitting, by the optical link apparatus, the resume optical pulse to the another optical link apparatus.

* * * * *